United States Patent [19]

Brems

[11] Patent Number: 4,588,067
[45] Date of Patent: May 13, 1986

[54] WORKPIECE CLAMPING MECHANISM FOR MULTIPLE STATION TRANSFER MACHINES UTILIZING ROTARY DRIVE

[76] Inventor: John H. Brems, Apt. 11-G, 2800 S. Ocean Blvd., Boca Raton, Fla. 33432

[21] Appl. No.: 559,622

[22] Filed: Dec. 12, 1983

[51] Int. Cl.⁴ .............................................. B65G 47/00
[52] U.S. Cl. ................................... 198/345; 29/1 A; 29/33 P
[58] Field of Search ............... 198/345; 29/1 A, 33 P; 464/40, 57, 58, 89

[56] References Cited

U.S. PATENT DOCUMENTS

| | | | |
|---|---|---|---|
| 2,618,137 | 11/1952 | White | 464/40 |
| 2,672,675 | 3/1954 | Cross | 198/345 X |
| 2,982,004 | 5/1961 | Cross | 29/33 P |
| 4,498,572 | 2/1985 | Brems | 29/33 P |

Primary Examiner—Joseph E. Valenza
Assistant Examiner—Jonathan D. Holmes
Attorney, Agent, or Firm—Barnes, Kisselle, Raisch, Choate, Whittemore & Hulbert

[57] ABSTRACT

A multiple station transfer machine in which workpieces are progressively transferred from work station to work station with workpieces individually clamped at each station by a movable clamp. A unified mechanism for clamping the workpieces at individual stations has a common rotary actuator which can function simultaneously at each work station. The clamping member is arranged to adapt to various clamping positions independently of the stroke of the actuator. A two-stage cam operates on each clamping member driven by a preloaded spring in response to motion of the common rotary movable actuator.

8 Claims, 18 Drawing Figures

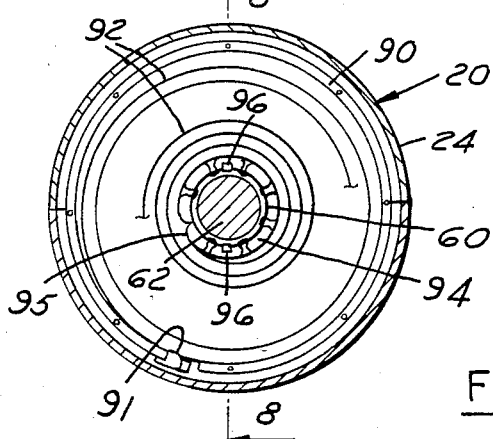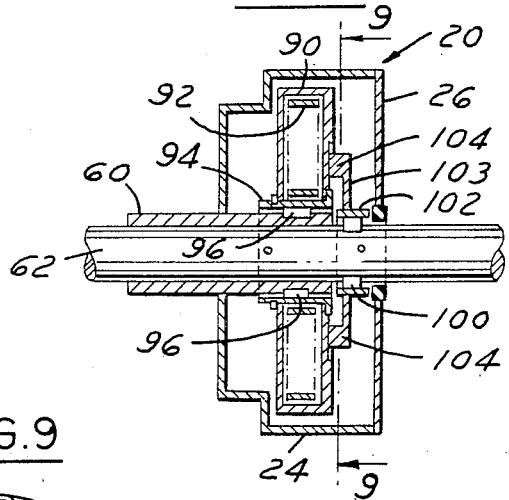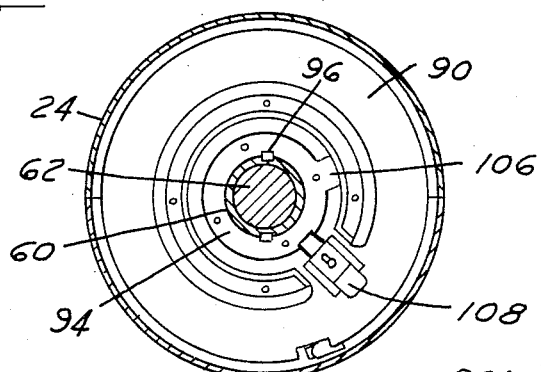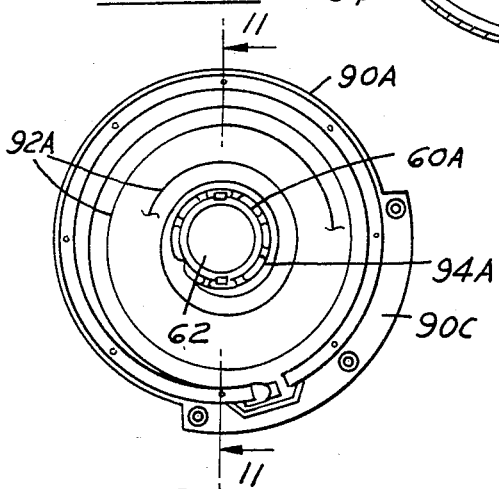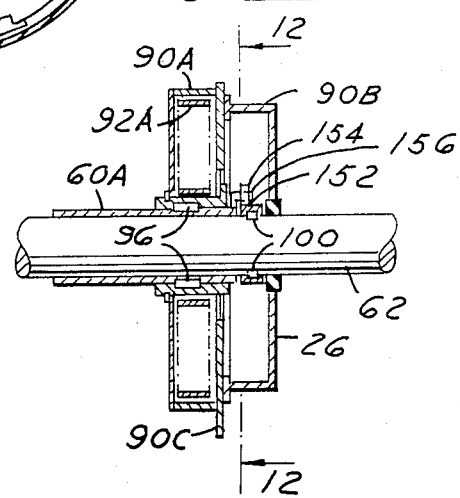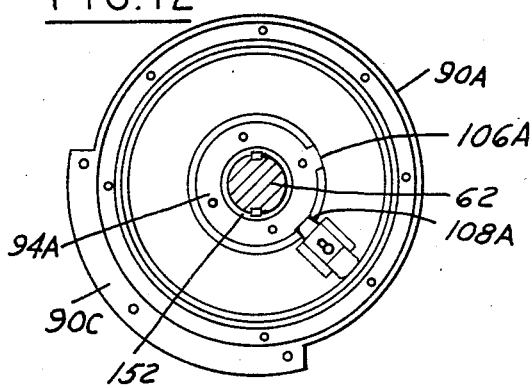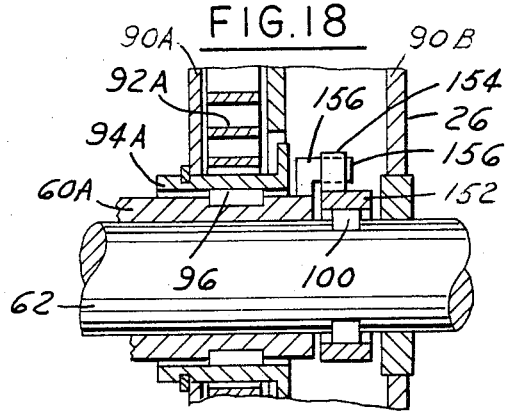

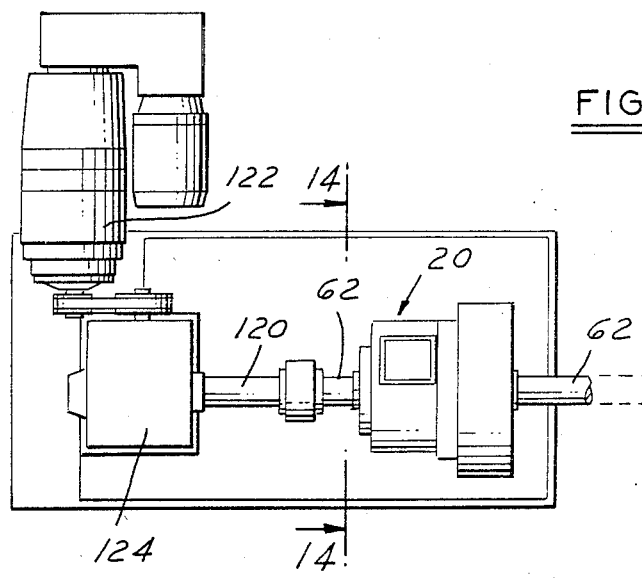
FIG.13
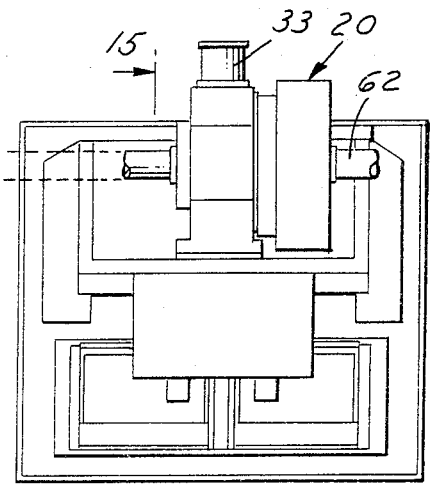
FIG.14
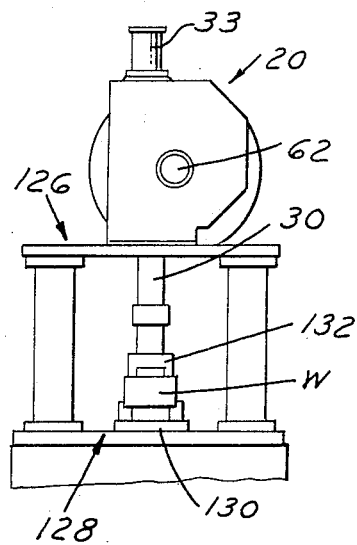
FIG.15
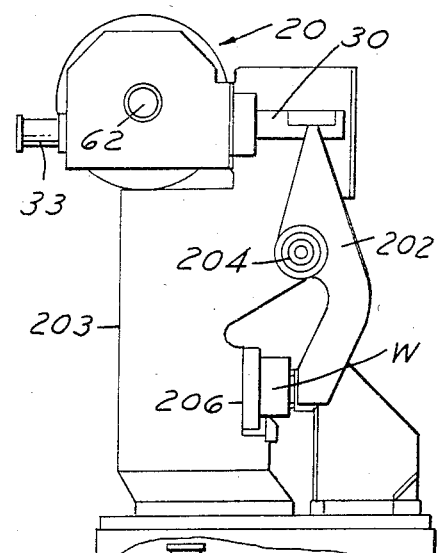
FIG.16
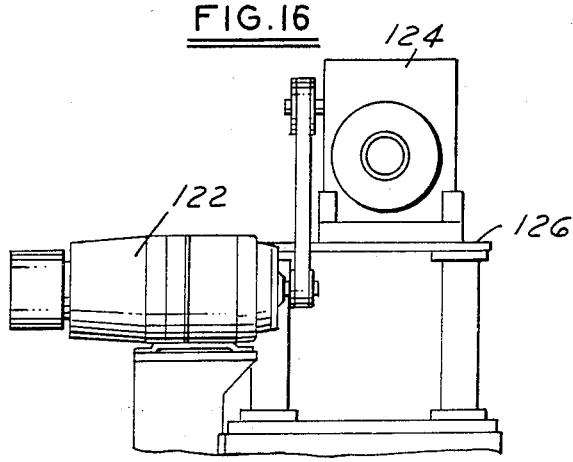
FIG.17
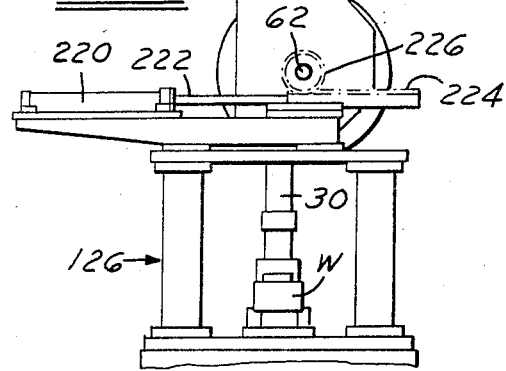

WORKPIECE CLAMPING MECHANISM FOR MULTIPLE STATION TRANSFER MACHINES UTILIZING ROTARY DRIVE

FIELD OF INVENTION

Multiple station transfer machines and clamping devices for workpieces.

BACKGROUND AND OBJECTS OF THE INVENTION

In the field of multiple station transfer machines, there exist two fundamentally different methods of transferring or moving a workpiece from station to station. In one method, a workpiece (or workpieces) is clamped in a pallet and the pallet is transferred from the station and is located and clamped in each station, thereby establishing the position of the workpiece with respect to each particular station. Techniques for the locating and clamping of such pallets are illustrated by my U.S. Pat. Nos. 4,201,284 and 4,362,233. Machines utilizing this technique are generally referred to as pallet machines. They are generally applied to workpieces whose configurations are such as to make it difficult to transfer and relocate the workpiece without benefit of a pallet.

However, there are some types of workpieces, for example, cylinder heads for internal combustion engines, in which it is possible to transfer the workpieces from station to station as independent workpieces, without their being clamped in a pallet. Such machines are referred to as free part transfer machines. In machines of this type, it is present normal practice to locate and clamp the workpieces in each station using separate hydraulically actuated mechanisms.

It is one object of this invention to provide a standard rotary actuated mechanical clamp module usable in free part transfer machines which can be used in a variety of clamping applications, and adapted to be driven by a single actuating means on a multiple station machine.

It is another object of this invention to provide, in the aforesaid mechanical clamp module, optional means for actuating the locating system for the workpiece in each station in the appropriate time relationship with the clamping system.

It is a further object to provide a preloaded spring in the force application system with alternate conditions of wind-up and wind-down adaptations to balance loading on the common actuator extending to the multiple stations.

In the general case, it is necessary for the workpiece clamps to be retracted several inches from the workpiece for the workpiece to be transferred into and out of a given station. As the clamps approach the workpiece, during the initial portion of a clamp operation, little force is required to move the clamps. However, once the clamps contact the workpieces, a large clamping force is required to hold properly the workpiece during the processing operation performed in any given station. It is another object of this invention to provide a mechanism which has a relatively low mechanical advantage from input to output during the inital portion of the clamp operation, then have a relatively large mechanical advantage from the input to output during the actual clamp portion of the operation.

Since it is intended that a single actuation mechanism be utilized to operate a multiplicity of mechanical clamp modules, it is very desirable that the mechanical efficiency of each unit be very high. It is another object of this invention to provide a mechanism in which the aforesaid movement objectives are met utilizing only high frequency mechanisms.

In my copending U.S. patent application, Ser. No. 327,517, filed Dec. 4, 1981, now U.S. Pat. No. 4,498,572, issued Feb. 12, 1985, a clamping system having substantially identical objectives has been disclosed. Whereas in that system, these objectives were achieved with a mechanism requiring a linear input motion operating parallel to the line of stations of a multiple station transfer machine, in this present invention the clamping system, in the various stations, is operated through the rotation of a shaft also operating parallel to that line of machine stations. The use of a rotating shaft, as opposed to the use of a linear motion, permits closer spacing of the clamp modules, and creates no expanding or contracting reaction forces between the machine stations, which is advantageous in many applications.

Other objects and features of the invention will be apparent in the following description and claims in which the principles of the invention are set forth together with details to enable persons skilled in the art to practice the invention, all in connection with the best mode presently contemplated for the invention.

BRIEF DESCRIPTION OF THE DRAWINGS

Drawings accompany the disclosure and the various views thereof may be briefly described as:

FIG. 7, a sectional view on line 7—7 on FIG. 1.

FIG. 8, a sectional view on line 8—8 of FIG. 7.

FIG. 9, a sectional view on line 9—9 of FIG. 8.

FIG. 10, a view of an alternate spring arrangement and modified sectional view on line 10—10 of FIG. 1.

FIG. 11, a sectional view on line 11—11 of FIG. 10.

FIG. 12, a sectional view on line 12—12 of FIG. 11.

FIG. 13, a view of a rotary drive prime mover in connection with two work stations having a different orientation.

FIG. 14, a sectional view on line 14—14 of FIG. 13.

FIG. 15, a sectional view on line 15—15 of FIG. 13.

FIG. 16, an end view of the rotary prime mover illustrated in FIG. 13.

FIG. 17, an alternate rotary drive mechanism.

FIG. 18, an enlarged view of the central portion of FIG. 11.

DETAILED DESCRIPTION OF THE INVENTION AND THE MANNER AND PROCESS OF USING IT

Figure 1:
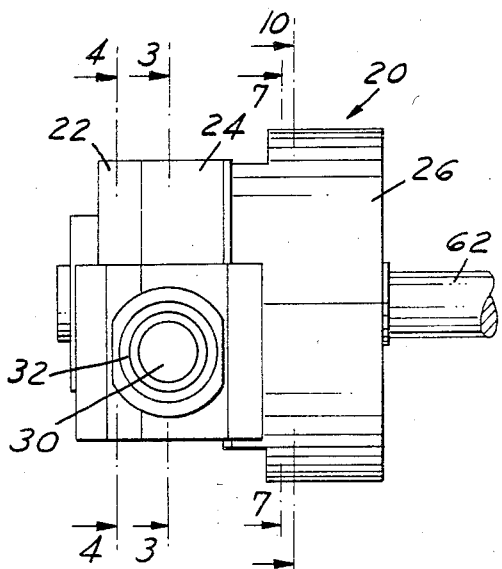
FIG. 1, an elevation of the clamping actuator used in the invention.
Figure 2:
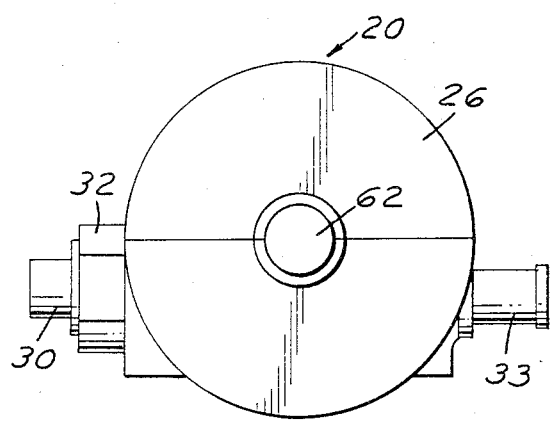
FIG. 2, an end view of the structure.

With reference to the drawings, in FIG. 1, an outside elevation of the clamp unit 20 for the invention is illustrated having an end housing 22, an intermediate housing 24, and a spring housing 26. An output bar 30 extends through a circular oil cover housing protuberance 32 at one end and is suitably enclosed at the other end by an oil cover cap 33. The output bar 30 is guided by pairs of pin mounted rollers 42 and 44 at each side of the housing 20 as shown in FIG. 3.

Figure 5:
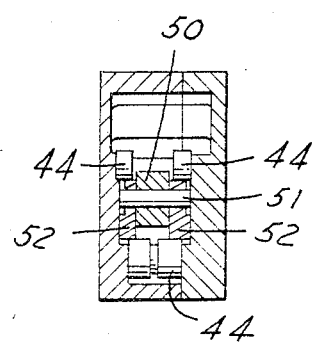
FIG. 5, a sectional view on line 5—5 of FIG. 3.

A primary cam follower 50 in the form of a roller is mounted on an axle pin 51 between bifurcate portions 52 on output bar 30 as illustrated in FIG. 5. A tubular input member 60 is journalled on a round shaft 62, these parts being also suitably journalled in the cover housing 22-24 of the clamp unit 20.

Figure 3:
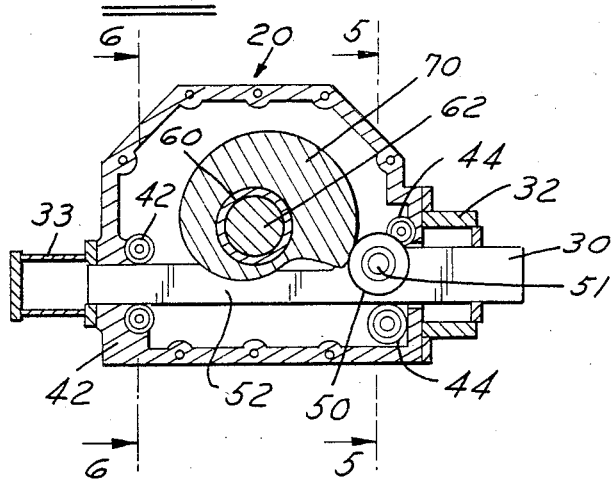
FIG. 3, a sectional view on line 3—3 of FIG. 1.

In FIG. 3, the sectional view shows a primary cam 70 mounted on and secured to tube 60 in a position to engage cam follower 50.

Figure 4:
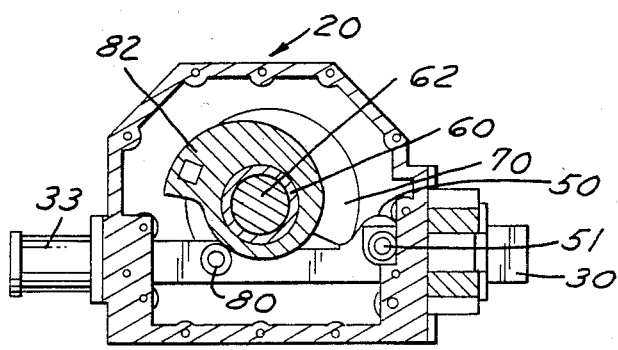
FIG. 4, a sectional view on line 4—4 of FIG. 1.
Figure 6:
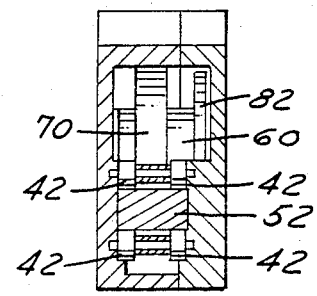
FIG. 6, a sectional view on line 6—6 on FIG. 3.

In FIG. 4, a secondary cam follower 80 in the form of a roller mounted on the side of the output bar 30 is in a position to engage a secondary cam means 82 also mounted on and secured to the tube 60 adjacent the primary cam 70.

In FIG. 3, the cam 70 is shown in the fully clamped position. It has been rotated in a counterclockwise direction as viewed in FIG. 3 until the largest radial portion is in contact with follower 50 in the clamping position of output bar 30 as will be later described. The shape of the cam is such that there is a reasonably rapid rise in the cam surface under low load conditions until near the end of the stroke where the rise continues but to a lesser degree with a substantial increase in mechanical advantage.

With reference to FIG. 4, the cams 70 and 82 are also shown in the fully clamped position of output bar 30. Cam 82 is in contact with the follower 80. When the cam set is reversed in rotation, in a clockwise direction, the follower 80 will be shifted to the left by the rising cam surface on cam 82 to shift the output bar 30 to the left and retract the work clamp as will be described.

Moving now to FIGS. 7 to 9, a mechanism within the circular spring housing portion 24 is illustrated. A cylindrical spring shell case 90 is journalled on a mandrel 94 in the stationary housing. Within this shell case 90 is wound a preloaded coil spring 92. The spring 92 is a multi-turn spiral spring with its inner end connected to the mandrel 94 at 95. The outer end of the spring 92 is connected to the shell case 90 and 91. The mandrel 94 is keyed to the tube 60 as shown in FIG. 7 at 96.

The shaft 62, which extends from station to station in the transfer line, carries, and is keyed to, a collar 102 supporting a flange 103 terminating in a plate ring 104 bolted to spring shell case 90; the spring shell case 90 is thereby directly connected to the shaft 62. A dog 106 is fastened to or made integral with the mandrel 94 and operates with a dog 108 mounted on the shell case 90. These dogs acting in the same plane limit the relative rotation of the mandrel 94 with respect to the shell case 90 to approximately 320°.

During assembly, the spring 92 is preloaded through several turns before the dog 108 is installed on the shell case 90; these dogs 106 and 108 therefore maintain the preload. As shown in FIG. 9, a gap has developed between the dog 106 and dog 108 representing the additional spring wind up encountered at the end of the full clamp stroke as will now be explained.

It can be seen that power rotation of the shaft 62, in a counterclockwise motion as viewed in FIGS. 3 and 4, will rotate the spring case 90 which will, through the coil spring 92 and the tube 60, move the cam 70 to actuate the output shaft 30 through cam follower 50 to the right which is the clamping direction. The shaft 62 is externally driven to rotate through a fixed angle of 315° by any one of several mechanisms to be described.

During the first portion (approximately 200°) of this 315° counterclockwise rotation of the shaft 62 and the spring shell case 90, this rotation is transmitted through the spring 92 to the mandrel 94, tube 60, and cams 70 and 82. Cam 70 extends the clamp bar 30 to the right in a clamping direction, through cam follower 50, while cam 82 and cam follower 80 permits this movement to occur. During this same interval, the cam follower 50 is on the first rise portion of cam 70 and the clamp bar 30 moves relatively rapidly with respect to the rotation of the shaft 62. In terms of the application which will be shown, it is also during this interval that the clamp bar 30 and the clamp system it drives have not yet contacted a workpiece and very little force is required.

During the second portion of the 315° counterclockwise rotation of the shaft comprising the final approximately 115° rotation thereof, the operation is exactly the same as during the first 200° of rotation except that the cam follower 50 is now driven by the relatively slow rise portion of the cam 70. Therefore, a large mechanical advantage exists from the input shaft to the output bar 30. It is during this interval in a typical application, to be described, that the clamp system, as driven by the output bar 30, contacts the workpiece and is thereby stalled and further movement of the output bar 30 is thereby prevented. When this occurs, the cam 70 is also prevented from further rotation and the fixed angular rotation of the shaft 62 is absorbed by the additional wind-up of the spiral spring 90, and an opening or gap develops between dogs 106 and 108, which had been in contact up to this point. Because of variations in the clamping situation created by small dimensional variations, elastic deflections and the like, the exact point of stall of the output bar cannot be accurately predicted, hence the relatively large range of high mechanical advantage and the relatively long spring to maintain a substantially constant cam torque and clamp force independent of the exact point of output stall.

During the reverse rotation of the shaft 62 in the clockwise direction, any wind-up in the spring 90 created by the stalling of the output shaft 30 is released during the initial portion of that rotation, which is as variable as had been the previous clamp stall position reached. When this additional spring wind-up is released, the dog 106 recontacts the dog 108. Dog 108 on the shell case 90, driven by the shaft 62, drives the dog 106 on the mandrel 94 connected through the tube 60 to cams 70 and 82. In short, with the dogs 106 and 108 in contact, the shaft 62 drives the cams 70 and 82 clockwise positively to accomplish the unclamp or leftward motion of the output bar 30.

In essence, the spring 92 is a rotary elastic member between the shaft 62 and the cams 70 and 82. It is acting in series with the input rotation and can deflect if the input rotary motion, which is fixed, exceeds the cam rotary motion permitted by the output bar stall.

An alternate method of spring application is shown in FIGS. 10, 11 and 12. In this embodiment, the shell case 90A and an auxiliary case 90B secured thereto are directly attached to the housing 24 through a flange 90C and hence are stationary and do not rotate. A spiral spring 92A is again fixed to the shell case 90A at its outer perimeter, as before. The inner turn of the spring 92 is again also fixed to a mandrel 94A which is connected to the tube 60A and on which are mounted the cams 70 and 82 also as before. A dog 106A is formed on the mandrel 94A and a dog 108A is mounted on the shell case 90A. It will be understood that these dogs are employed to permit preloading of the spring 92A during assembly as previously described.

As illustrated in FIG. 11, and enlarged FIG. 18, a sleeve 152 is mounted to and keyed on the shaft 62 (in place of the collar 102 in the previous embodiment). This sleeve 152 is housed within the cover 90B and is provided with a dog 154 which is positioned to contact a dog 156 which is part of the tube 60A.

When the shaft 62 is in its full counterclockwise position, the cams are in their full clamped position and a gap exists between dogs 106A and 108A as previously described. A similar gap will exist between dog 154 mounted on sleeve 152 keyed on shaft 62, and dog 156 on tube 60A which carries the cams. The cam torque is provided solely by the spring 92A reacting against its stationary shell case 90A. During the unclamp rotation of shaft 62 (which is clockwise), the dog 154 on sleeve 152 contacts dog 156 on tube 60A to rotate the cams clockwise. Since tube 60A is keyed to mandrel 94A, this unclamp rotation further increases the wind-up of the spring 92A.

During the clamp rotation, the shaft 62 and sleeve 152 permit the spring 92A to rotate the cams in their counterclockwise direction through mandrel 94A and tube 60A. In essence, in this embodiment, the elastic spring and the external actuating shaft operate in parallel, with the unclamp energy provided by the external means, shaft 62, which is stored as additional wind-up rotation and energy in the spring. During the clamp rotation of shaft 62, it is merely releasing and controlling the rotation provided by the spring.

In this latter embodiment, the normal angular excursion of the spring will be approximately 200° to 315° depending on the clamping stall point, whereas in the former embodiment the normal spring excursion will be approximately 0° to 115°. Furthermore, it can be seen that the shaft 62 must supply energy to the clamp system during clamping in the first embodiment whereas it is absorbing energy from the clamp system during clamping in the second embodiment. This is of value in multi-station machines where these energies can be at least partially offset to minimize the total input energy required for clamping.

A typical application of two of these clamp units 20 is shown in FIGS. 13-16. The output shaft 120 of a gear reducer 124, driven by a reversible motor 122, is directly coupled to the shaft 62 which operates two clamp units 20, one as shown in elevation (FIG. 14), and the other as shown in elevation (FIG. 15). It will be understood that these clamp units 20 operate in separate stations of the same transfer machine and that additional stations may be utilized.

In FIG. 14, the clamp unit 20 is mounted to a station frame 126 and is oriented such that the output bar 30 operates in a vertically downward direction. The work station 128 carries a fixture 130 in which a workpiece W is supported; this workpiece W is clamped downward into the fixture by a clamp pad 132 coupled to the outboard end of output bar 30 of the clamp unit 20 in that station. The clamp pad 132 is exerting a large downward force on the workpiece as generated by the clamp unit 20. It is at this position that the cam follower 50 within the clamp unit is on the low rise and high mechanical advantage portion of the cam 70 as previously described. It can be seen that during the unclamp stroke or clamp approach stroke, very little force is required, and further that relatively large strokes under these conditions facilitate workpiece transfer.

In the separate station illustrated by FIG. 15 the clamp unit 20 is oriented to provide a horizontal output, to the right for clamping, as shown in the original embodiment. Its output bar 30 is coupled to a lever 202 pivoted to a column 203 at a pivot point 204. The column 203 supports the clamp unit 20 and a fixture 206 in which is nested the workpiece W. The workpiece is clamped into the fixture by the lower end of the lever 202. It can be seen that the outward clamping movement of the output bar 30 causes the lever 202 to exert a clamping force on the workpiece to hold it in the fixture 206. It is in the position shown that the cam follower 50 within the clamp unit is on the low rise and high mechanical advantage portion of the cam 70 as previously described. It can also be seen that during the unclamp stroke or clamp approach stroke, very little force is required, and again that relatively large clamp clearance strokes facilitate loading and unloading of the station.

The clamp units 20 in FIGS. 14 and 15 are shown in different orientations, yet both are actuated by the common actuator shaft 62. Other stations along a given transfer machine may utilize different clamp units 20 in the same, similar or very different orientations, yet all operated by a common drive shaft.

In the illustrative application of FIGS. 13-16, a simple gear reducer drive for the common drive shaft 62 was shown. Other equally applicable and safer mechanisms, insofar as overtravel control is concerned, are those which can be designed to have a dwell at each end of their reversible travel. Among these are mechanisms such as disclosed in my U.S. Pat. Nos. 3,730,014; 3,789,676; and 4,018,090.

FIG. 17 illustrates another mechanism to generate the rotary reciprocating motion for shaft 62. An air or hydraulic cylinder has its output cylinder drive a rack 224; this rack 224 meshes with a drive pinion 226 mounted on the shaft 62, all being mounted on the station frame 126. The components are sized to be able to provide the required torques and rotation angles.

I claim:
1. In a multiple station transfer system in which workpieces are progressively transferred from station to station in said system and in which said workpieces are individually clamped in each station by movable clamp means, a unified mechanism for clamping said workpieces in the individual stations, which comprises:
 (a) one of more rotary clamp modules mounted in each station and in which each said rotary clamp module comprises:
  (1) a housing,
  (2) an elongate rotary input member journalled in said housing,
  (3) an output member mounted in said housing for movement along a predetermined lineal path transverse to said input member and operatively associated with said clamp means,
  (4) a primary cam follower member mounted on said output member and cooperating with a
  (5) primary rotary cam means mounted on said input member to rotate with said input member,
  (6) a secondary return cam follower member mounted on said output member spaced along said output member from said primary cam follower and cooperating with a
  (7) secondary rotary return cam means mounted on and rotated with said input member and spaced axially along said input member from said primary cam means,

(8) elastic drive means operatively interconnecting said input member and said cam means, and (b) reversible rotary drive means mounted on said machine and operatively connected with multiple said input members and multiple said elastic drive means of said multiple rotary clamp modules.

2. A multiple station transfer system as defined in claim 1 in which said rotary drive means comprises a first rotary shaft, a prime mover to reversibly rotate said shaft, said input member comprising a tubular second shaft mounted concentrically with said first shaft, and said elastic drive means comprises a coil spring coaxially mounted with respect to said shafts, the inner end of said spring being affixed to said tubular shaft and the outer end of said spring being operatively associated with said first shaft whereby said spring is interposed between said first shaft and said second shaft and actuation of said first shaft will drive said tubular shaft through said spring from an initial position.

3. A multiple station transfer system as defined in claim 2 in which a clamp mechanism is driven linearly by said primary cam means and primary cam follower a predetermined distance in terms of the angular motion of said primary cam means, and said first rotary shaft has an angular motion greater than that of said primary cam means whereby said coil spring is torsioned to bring additional spring pressure to bear on said clamp mechanism.

4. A multiple station transfer system as defined in claim 2 in which means associated with said first rotary shaft and means associated with said tubular shaft mechanically engage in the reversal motion of said input shaft to return said second shaft and said coil spring to its initial position.

5. A multiple station transfer system as defined in claim 1 in which said rotary drive means comprises a first rotary shaft, a prime mover to reversibly rotate said shaft, said input member comprising a tubular second shaft mounted concentrically with said first shaft, and said elastic drive means comprises a coil spring coaxially mounted with respect to said shafts, the said coil spring being pre-wound and having the inner end connected to said tubular shaft and the outer end connected to a stationary portion of the housing, said tubular shaft being associated with said first rotary shaft whereby rotation of said first shaft releases said pre-wound spring to drive said tubular shaft and said primary cam means to a work clamping station, and reversal motion of said input shaft rewinds said coil spring.

6. A multiple station transfer system as defined in claim 1 in which said rotary drive means comprises a first rotary shaft, a prime mover to reversibly rotate said shaft, said input member comprising a second rotary shaft, and said elastic drive means has one end connected to said second shaft and the other end operatively connected to said first shaft whereby actuation of said first shaft will drive said second shaft through the said elastic drive means.

7. A system as defined in claim 6 in which mechanical means is engaged to positively drive said second shaft in a reversal rotation independent of said elastic drive means when said prime mover is reversely driven.

8. A system as defined in claim 1 in which said rotary drive means comprises a first rotary shaft, a prime mover to reversibly rotate said shaft, said input member comprising a second rotary shaft, and said elastic drive means is under tension and preloaded and engaged to act on said output member, and said first shaft is connected to restrain the action of said elastic drive means until said first shaft is rotated in an actuating direction.

* * * * *